(12) United States Patent  
Han et al.

(10) Patent No.: US 8,883,332 B2
(45) Date of Patent: Nov. 11, 2014

(54) RECHARGEABLE SECONDARY BATTERY

(75) Inventors: Minyeol Han, Yongin-si (KR); Sooseok Choi, Yongin-si (KR); Jeongwon Oh, Yongin-si (KR); Sangwon Byun, Yongin-si (KR)

(73) Assignees: Samsung SDI Co., Ltd., Yongin-Si, Gyeonggi-Do (KR); Robert Bosch GmbH, Stuttgart (DE)

(*) Notice: Subject to any disclaimer, the term of this patent is extended or adjusted under 35 U.S.C. 154(b) by 192 days.

(21) Appl. No.: 13/563,159

(22) Filed: Jul. 31, 2012

(65) Prior Publication Data

US 2013/0149570 A1    Jun. 13, 2013

Related U.S. Application Data

(60) Provisional application No. 61/568,880, filed on Dec. 9, 2011.

(51) Int. Cl.
*H01M 2/34* (2006.01)

(52) U.S. Cl.
USPC .......................................................... 429/61

(58) Field of Classification Search
None
See application file for complete search history.

(56) References Cited

U.S. PATENT DOCUMENTS

| | | | |
|---|---|---|---|
| 5,800,937 A | | 9/1998 | Decker et al. |
| 5,902,080 A | * | 5/1999 | Kopras .................. 409/182 |
| 2002/0015892 A1 | * | 2/2002 | Kitoh ..................... 429/243 |
| 2003/0044677 A1 | * | 3/2003 | Naruoka ................. 429/161 |
| 2005/0064278 A1 | * | 3/2005 | Fetcenko et al. ......... 429/50 |
| 2006/0040173 A1 | * | 2/2006 | Shimamura et al. ..... 429/99 |
| 2009/0212736 A1 | * | 8/2009 | Baarman et al. ........ 320/106 |
| 2011/0136004 A1 | | 6/2011 | Kwak et al. |

FOREIGN PATENT DOCUMENTS

| | | |
|---|---|---|
| EP | 2293367 A1 | 3/2011 |
| EP | 2385567 A1 | 11/2011 |
| JP | 2003-142068 A | 5/2003 |
| KR | 10-2011-0123462 A | 11/2011 |
| KR | 10-2011-0136166 A | 12/2011 |

OTHER PUBLICATIONS

European Search Report dated Apr. 9, 2013.

* cited by examiner

*Primary Examiner* — Patrick Ryan
*Assistant Examiner* — Wyatt McConnell
(74) *Attorney, Agent, or Firm* — Lee & Morse, P.C.

(57) ABSTRACT

A battery, for example, a secondary battery, includes a case, an electrode assembly in the case, a current collector electrically connected with the electrode assembly, a terminal coupled to the current collector, and a first short circuit inducing member electrically coupled to the electrode assembly and to the current collector. The first short circuit inducing member is arranged between the electrode assembly and the case and the first short circuit inducing member includes a first fuse part.

20 Claims, 17 Drawing Sheets

RECHARGEABLE SECONDARY BATTERY

CROSS-REFERENCE TO RELATED APPLICATION

The present application claims priority under 35 U.S.C. §119(e) to U.S. Provisional Application No. 61/568,880, filed on Dec. 9, 2011, and entitled: "Rechargeable Secondary Battery," which is incorporated herein by reference in its entirety.

BACKGROUND

A battery, e.g., a lithium ion secondary battery, has been used in a small-sized electronic device such as a notebook computer or a cellular phone. In addition, since the lithium ion secondary battery has high output, high capacity, and lightweight characteristics, it has started to be put into use in hybrid vehicles and electric vehicles. Batteries, e.g., the lithium ion secondary battery, used for a vehicle should satisfy safety and reliability requirements under highly stressed conditions.

SUMMARY

Embodiments may be realized by providing a battery including a case, an electrode assembly in the case, a current collector electrically connected with the electrode assembly, a terminal coupled to the current collector, and a first short circuit inducing member electrically coupled to the electrode assembly and to the current collector. The first short circuit inducing member is arranged between the electrode assembly and the case and the first short circuit inducing member includes a first fuse part.

The current collector may include a second fuse part having a different electrical resistance from that of the first fuse part. The first short circuit inducing member may be coupled to the current collector through the first fuse part. The terminal may extend from an inside of the case to an outside of the case. The current collector may include a second fuse part and the first fuse part may be closer to the terminal than the second fuse part.

The first fuse part has a first resistance value and the second fuse part has a second resistance value, and the first resistance value may be higher than the second resistance value. The first fuse part has a first sectional area and the second fuse part has a second sectional area, and the first sectional area may be smaller than the second sectional area.

The first short circuit inducing member may include a first planar region that overlaps a non-coating region of the electrode assembly. The first fuse part may extend from the first planar region to the current collector. A second planar region may overlap a region of the electrode assembly that excludes the non-coating region. A bent region may be bent from the first planar region and the second planar region.

The first planar region may be adhered to the non-coating region and the second planar region may be adhered to the region of the electrode assembly that excludes the non-coating region. A width of the first fuse part may be smaller than a width of the first planar region.

The first fuse part may include a first portion that extends from the first planar region of the first short circuit inducing member, and a second portion bent from the first portion and adhered to the current collector. The first and second portions of the first fuse part as well as the first planar region, the second planar region, and the bent region of the of the first short circuit inducing member may be made of a same material and may be integrally formed as one continuous piece. The first portion of the first fuse part may include at least one hole or cut-out groove.

The battery may include a second short circuit inducing member and an insulating plate. The second short circuit inducing member may overlap the first short circuit inducing member and the insulating plate may be arranged between the first and second short circuit inducing members. The first short circuit inducing member may be arranged between the insulating plate and the electrode assembly.

The battery may include a second short circuit inducing member that includes a first planar region adhered to a second non-coating region of the electrode assembly, a third planar region adhered to a region of the electrode assembly that excludes the second non coating region, and a second planar region extending between the first and third planar regions.

The first short circuit inducing member may be one of a plurality of first short circuit inducing members. Each of the plurality of first short circuit inducing members may be arranged adjacent to different sides of the electrode assembly. The electrode assembly may be one of a plurality of electrode assemblies and the first short circuit inducing member may be one of a plurality of first short circuit inducing members.

The current collector may include a first region, a second region, and a third region. The first region may be coupled to a non-coated region of the electrode assembly. The third region may be electrically connected to the terminal. The second region may extend between the first and third regions. The first fuse part may be connected to the second region or to the third region.

The current collector may include a second fuse part, the second fuse part being in the second region or in the third region of the current collector. The second fuse part may be in the second region and the first fuse part may be adjacent to the third region.

Embodiments may be realized by providing a secondary battery including an electrode assembly, a case accommodating the electrode assembly, first and second terminals electrically connected to the electrode assembly and exposed to the outside through the case, first and second short circuit inducing members disposed between the electrode assembly and the case and electrically connected to the first and second terminals, respectively, and the first short circuit inducing member is connected to the first terminal through the fuse.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1A:
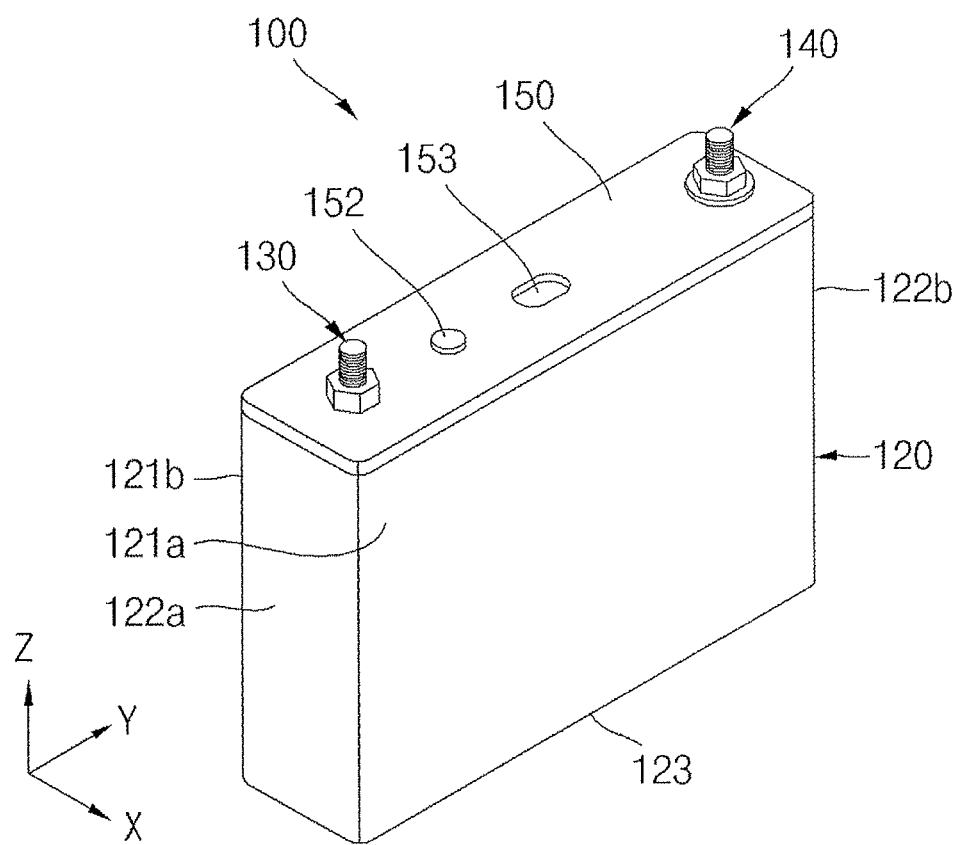
FIGS. 1A, 1B, and 1C illustrate a perspective view, a vertical cross-sectional view and a horizontal cross-sectional view, respectively, of a secondary battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout. In addition, it will be understood that when an element is referred to as being "electrically connected to" another part, it can be directly connected to the other part, or intervening elements may also be present.

Figure 1B:
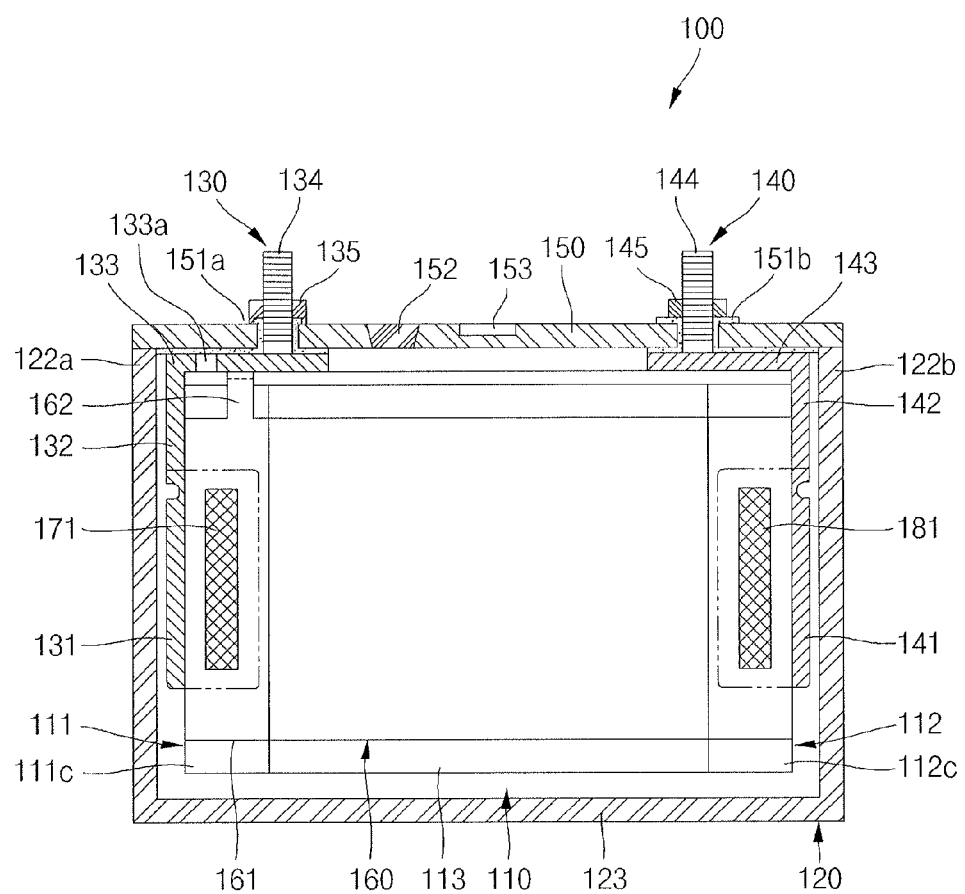
Figure 1C:
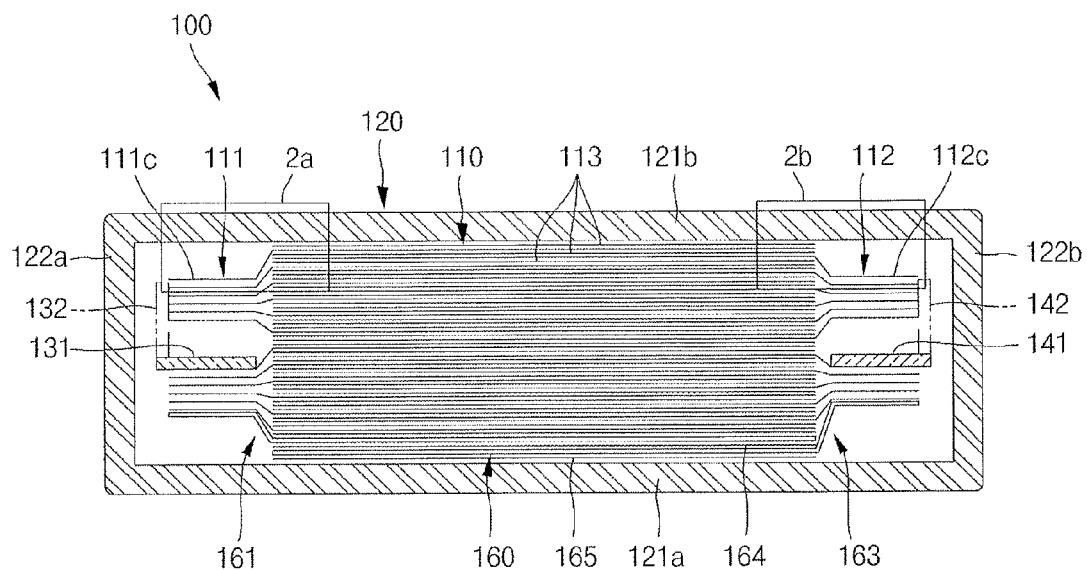

FIGS. 1A to 1C illustrate a perspective view, a vertical cross-sectional view, and a horizontal cross-sectional view, respectively, of a secondary battery according to an exemplary embodiment.

As shown in FIGS. 1A to 1C, the secondary battery 100 according to an exemplary embodiment may include an electrode assembly 110, a case 120, a first terminal/current collector member 130, a second terminal/current collector member 140, a cap plate 150, and a short circuit inducing member 160. Here, the case 120 may be referred to as a can, and may encompass the cap plate 150, in some embodiments.

The electrode assembly 110 may include a first electrode plate 111, a second electrode plate 112, and a separator 113. The electrode assembly 110 may be of a substantially wound jelly roll type or a stacked type.

Figure 2A:
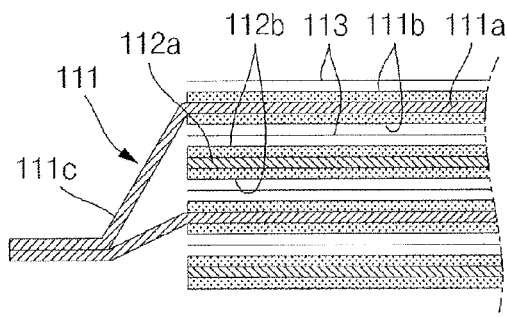
FIGS. 2A and 2B illustrate enlarged views of regions 2a and 2b of FIG. 1C, respectively.
Figure 2B:
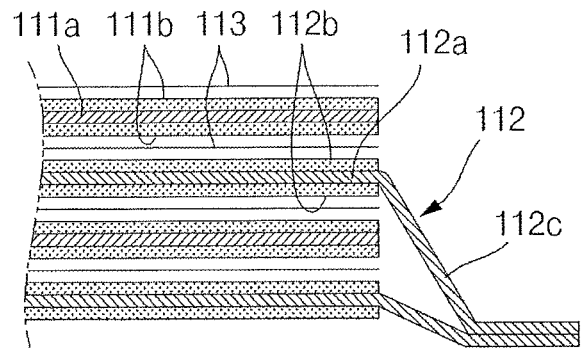

The first electrode plate 111 may be a positive electrode plate and the second electrode plate 112 may be a negative electrode plate. Alternatively, the first electrode plate 111 may be a negative electrode plate and the second electrode plate 112 may be a positive electrode plate. The first electrode plate 111 may include a first metal foil 111a and at least one first active material 111b, e.g., as illustrated in FIGS. 2A and 2B. The separator 113 may be on both opposing surfaces of the first electrode plate 111. When the first electrode plate 111 is a positive electrode plate, the first metal foil 111a may include, e.g., aluminum, and the first active material 111b may include, e.g., a lithium-based oxide.

The second electrode plate 112 may include a second metal foil 112a and a second active material 112b, e.g., as illustrated in FIGS. 2A and 2B. The separator 113 may be on both opposing surfaces of the second electrode plate 112. When the second electrode plate 112 is a negative electrode plate, the second metal foil 112a may include, e.g., copper, and the second active material 112b may include, e.g., graphite. However, embodiments of the materials used to form the first and second electrode plates 111 and 112 are not limited thereto.

The separator 113 may be positioned between one first electrode plate 111 and an adjacent second electrode plate 112. The separator 113 may be formed of at least one of, e.g., porous polyethylene (PE), polypropylene (PP), and equivalents thereof. However, embodiments are not limited thereto. The separator 113 may be practically positioned on both opposing surfaces of the first electrode plate 111 and/or on both opposing surfaces of the second electrode plate 112. The separator 113 may be positioned on the outermost portions of the electrode assembly 110, e.g., to cover the outermost surfaces of the electrode assembly 110. The separator may reduce the possibility of and/or prevent a predetermined region of the electrode assembly 110 from being shorted from the case 120, the cap plate 150, and the short circuit inducing member 160.

The first electrode plate 111 may include a first non-coating region 111c without a positive active material 111b coated thereon. As illustrated in FIG. 2A, the first non-coating region 111c may protrude to the outside through one side of the separator 113, e.g., the separator 113 may not overlap the first non-coating region 111c. The second electrode plate 112 may include a second non-coating region 112c without a negative active material 112b coated thereon. As illustrated in FIG. 2B, the second non-coating region 112c may protrude to the outside through another side of the separator 113, e.g., the separator 113 may not overlap the second non-coating region 112c. For example, the first non-coating region 111c and the second non-coating region 112c may protrude in opposite directions with respect to the separator 113.

The case 120 may have wide surfaces, e.g., two wide side surfaces 121a and 121b, narrow surfaces, e.g., two narrow side surfaces 122a and 122b, and a bottom surface 123, e.g., as illustrated in FIG. 1A. The case 120 has an open top portion. The open top portion may be covered by the cap plate 150. The electrode assembly 110 and electrolyte may be accommodated within the case 120. The first non-coating region 111c and the second non-coating region 112c of the electrode assembly 110 may face the two narrow side surfaces 122a and 122b, respectively. The case 120 may be formed of, e.g., at least one of aluminum, an aluminum alloy, copper, a copper alloy, iron, an iron alloy, SUS, and equivalents thereof. However, embodiments are not limited thereto.

The first terminal/current collector member 130 and the second terminal/current collector member 140 may be electrically connected to the first electrode plate 111 and the second electrode plate 112 of the electrode assembly 110, respectively. For example, the first terminal/current collector member 130 may be welded to the first electrode plate 111 and the second terminal/current collector member 140 may be welded to the second electrode plate 112. The first terminal/current collector member 130 may be welded to the first non-coating region 111c of the first electrode plate 111. The second terminal/current collector member 140 may be welded to the second non-coating region 112c of the second electrode plate 112.

The first terminal/current collector member 130 may include a first region 131, a second region 132, a third region 133, a fuse part 133a, and a fourth region 134. The first region 131, the second region 132, and the third region 133 may form a current collector region of the first terminal/current collector member 130. The fuse part 133a may be formed in the current collector region so that the fuse part 133a may be formed in one of the first region 131, the second region 132, and the third region 133. The fuse part 133a may be a fuse formed in the current collector region of the first terminal/current collector member 130. The fourth region 134 may form a terminal region of the first terminal/current collector member 130.

The first region 131 may be inserted into the inside of the first electrode plate 111 of the electrode assembly 110, e.g., as illustrated in FIG. 1B. For example, the first region 131 may be welded to the inside of the electrode assembly 110 in the first non-coating region 111c. The fuse part 133a may be formed in the second region 132 or the third region 133.

The second terminal/current collector member 140 may include a first region 141, a second region 142, a third region 143 and a fourth region 144. The first region 141, the second region 142, and the third region 143 may form a current collector region of the second terminal/current collector member 140. The fourth region 144 may form a terminal region of the second terminal/current collector member 140.

The first region 141 may be inserted into the inside of the second electrode plate 112 of the electrode assembly 110, e.g., as illustrated in FIG. 1B. For example, the first region 141 may be inserted to the inside of the of the electrode assembly 110 in the second non-coating region 112c.

The fourth regions 134 and 144 of the first terminal/current collector member 130 and the second terminal/current collector member 140, respectively, may penetrate through the cap plate 150 to then be exposed or protruded to the outside of the case 120. Accordingly, the fourth regions 134 and 144 may include terminals of the secondary battery 100. The terminals of the secondary battery 100 may be adjacent to the cap plate 150 and may extend from the inside to the outside of the case 120.

Referring to FIG. 1B, first and second fixing members 135 and 145 may be coupled to the fourth regions 134 and 144 of the first terminal/current collector member 130 and the second terminal/current collector member 140, respectively. The first and second fixing members 135 and 145 may surround the first and second terminal/current collector members 130 and 140, respectively, and may be on via-holes in the cap plate 150 through which the first and second terminal/current collector members 130 and 140 extend. The first terminal/current collector member 130 and the second terminal/current collector member 140 may be firmly fixed to the cap plate 150 via the first and second fixing members 135 and 145, respective.

A predetermined region of the first fixing member 135 may be directly electrically connected to the cap plate 150. For example, the first fixing member 135 may be a high resistance member. In one exemplary embodiment, the first fixing member 135 may be formed of, e.g., an alloy such as a stainless steel and/or equivalents thereof. Generally, stainless steel has a higher resistance value than aluminum or an aluminum alloy. In other words, the first fixing member 135 may have a higher resistance than the case 120 and the cap plate 150.

The cap plate 150 may cover the case 120 and the first terminal/current collector member 130 and the second terminal/current collector member 140 may be exposed and/or protruded to the outside of the case 120. A boundary between the case 120 and the cap plate 150 may be, e.g., welded by laser beam. The respective fourth regions 134 and 144 of the first terminal/current collector member 130 and the second terminal/current collector member 140 may penetrate through the cap plate 150. Insulating members 151a and 151b may be formed on portions of outer peripheral edges of the first terminal/current collector member 130 and the second terminal/current collector member 140, respectively, that extend through the via-holes in the cap plate 150. Therefore, the respective fourth regions 134 and 144 of the first terminal/current collector member 130 and the second terminal/current collector member 140, respectively, may be electrically insulated from the cap plate 150. However, as described above, since the first fixing member 135 may be a high resistance member that is directly connected to the cap plate 150, both the cap plate 150 and the case 120 may have a polarity (e.g., a positive polarity).

An electrolyte plug 152 may be coupled to the cap plate 150, e.g., may be disposed in another via-hole in the cap plate 150. A relatively thin safety vent 153 may also be formed in the cap plate 150. The cap plate 150 and the case 120 may be formed of substantially the same material.

The short circuit inducing member 160 may be positioned between the electrode assembly 110 and the case 120. For example, the short circuit inducing member 160 may be positioned between the electrode assembly 110 and at least one of the wide side surfaces 121a and 121b of the case 120.

The short circuit inducing member 160 may include a first short circuit inducing member 161, a second short circuit inducing member 163, and an insulating plate 164 positioned between the first short circuit inducing member 161 and the second short circuit inducing member 163. A height of the short circuit inducing member 160 may be less than a height of the electrode assembly 110, e.g., the short circuit inducing member 160 may be in an overlapping relationship with a central portion of the electrode assembly 110 and may be in a non-overlapping relationship with lateral ends of the electrode assembly 110.

The first short circuit inducing member 161 may be electrically connected to the second region 132 or the third region 133 of the first terminal/current collector member 130 through a fuse part 162. The fuse part 162 may include a fuse therein. For example, the first short circuit inducing member 161 may include the fuse part 162 and the fuse part 162 may be welded to the second region or the third region 133 of the first terminal/current collector member 130. The first short circuit inducing member 161 may be electrically connected to the first non-coating region 111c of the first electrode plate 111. For example, the first short circuit inducing member 161 may be welded to the electrode assembly 110, e.g., may be welded to the first non-coating region 111c. The first short circuit inducing member 160 and the case 120 may have the same polarity. The second short circuit inducing member 163 may be electrically connected to the second non-coating region 112c of the second electrode plate 112. For example, the second short circuit inducing member 163 may be welded to the electrode assembly 110, e.g., may be welded to the second non-coating region 112c. The second short circuit inducing member 163 may have the opposite polarity as compared to the first short circuit inducing member 161.

The insulating plate 164 may function to reduce the possibility of and/or prevent an electrical short circuit between the first short circuit inducing member 161 and the second short circuit inducing member 163, e.g., until the short circuit inducing member 160 starts operating. In addition, an insulating plate 165 may be positioned between the short circuit inducing member 160 and the case 120, e.g., as illustrated in FIGS. 5A to 5D. The insulating plate 165 may function to reduce the possibility of and/or prevent an electrical short circuit between the second short circuit inducing member 163 and the case 120, e.g., until the short circuit inducing member 160 starts operating.

In the event of a highly stressed condition such as nail penetration of secondary battery, e.g., the secondary battery 100 according to an exemplary embodiment, the insulating plates 164 and 165 may be broken or damaged to allow operation of the first short circuit inducing member 161 and the second short circuit inducing member 163 of the short circuit inducing member 160. For example, the first and second short circuit inducing members 161 and 163 may be electrically shorted, e.g., directly electrically shorted. According to an exemplary embodiment, when the first short circuit inducing member 161 and the second short circuit inducing member 163 have smaller electrical resistances than the electrode assembly 110, in an event of a short circuit little heat may be generated and a large amount of current may be rapidly consuming. Accordingly, heat generation, e.g., an excessive temperature rise, rarely occurs during nail penetration of the secondary battery 100, thereby improving penetration safety and reliability of the secondary battery 100.

In addition, during nail penetration of the secondary battery 100, a short circuit current path may be changed multiple times by the fuse part 162 formed in the first short circuit inducing member 161. For example, fuses in the fuse parts 133a and 162 may be melted and cut off to disperse and consume energy of the electrode assembly 110, which will later be described in further detail. For example, Joule heat of the electrode assembly 110 may be dispersed and consumed, thereby more effectively preventing and/or reducing the possibility of an excessive temperature rise and a fire from occurring to the secondary battery 100.

In addition, since the short circuit inducing member 160 may be positioned between the electrode assembly 110 and the case 120 in the form of a relatively thick plate, the short circuit inducing member 160 may function to support the electrode assembly 110 while preventing the case 120 from swelling.

Referring to FIG. 1B, reference numeral 171 denotes a welding region of the first region 131 of the first terminal/current collector member 130, the first non-coating region 111c of the electrode assembly 110, and the first short circuit inducing member 161. Reference numeral 181 denotes a welding region of the first region 141 of the second terminal/current collector member 140, the second non-coating region 112c of the electrode assembly 110, and the second short circuit inducing member 163. In FIG. 1B, the welding regions are substantially rectangular; however, embodiments are not limited thereto.

FIGS. 2A and 2B illustrate enlarged views of regions 2a and 2b, respectively of FIG. 1C.

As shown in FIG. 2A, the electrode assembly 110 may include the first electrode plate 111 having the first metal foil 111a (e.g., an aluminum foil or an aluminum mesh), the first active material 111b (e.g., a lithium-based oxide), and the first non-coating region 111c without the first active material coated thereon. In addition, the electrode assembly 110 may include the second electrode plate 112 having the second metal foil 112a (e.g., a copper foil), the second active material 112b (e.g., graphite), and the second non-coating region 112c without the second active material coated thereon.

The separator 113 may be made of at least one of polyethylene (PE) and polypropylene (PP) and may be disposed on or under the first electrode plate 111. The separator 113, e.g., the portions made of at least one of polyethylene (PE) and polypropylene (PP), may be disposed on or under the second electrode plate 112. The first non-coating region 111c and the second non-coating region 112c may extend to the outside through opposing sides of the separator 113.

In order to improve welding efficiency, the first non-coating region 111c may be closely adhered to or welded to the first region 131 of the first terminal/current collector member 130. For example, the first short circuit inducing member 161 may be welded to the first non-coating region 111c. The second non-coating region 112c may extend to the outside through the other side of the separator 113. In order to improve welding efficiency, the second non-coating region 112c may be closely adhered to or welded to the first region 141 of the second terminal 140. As described above, the second short circuit inducing member 163 may be welded to the second non-coating region 112c.

Figure 3A:
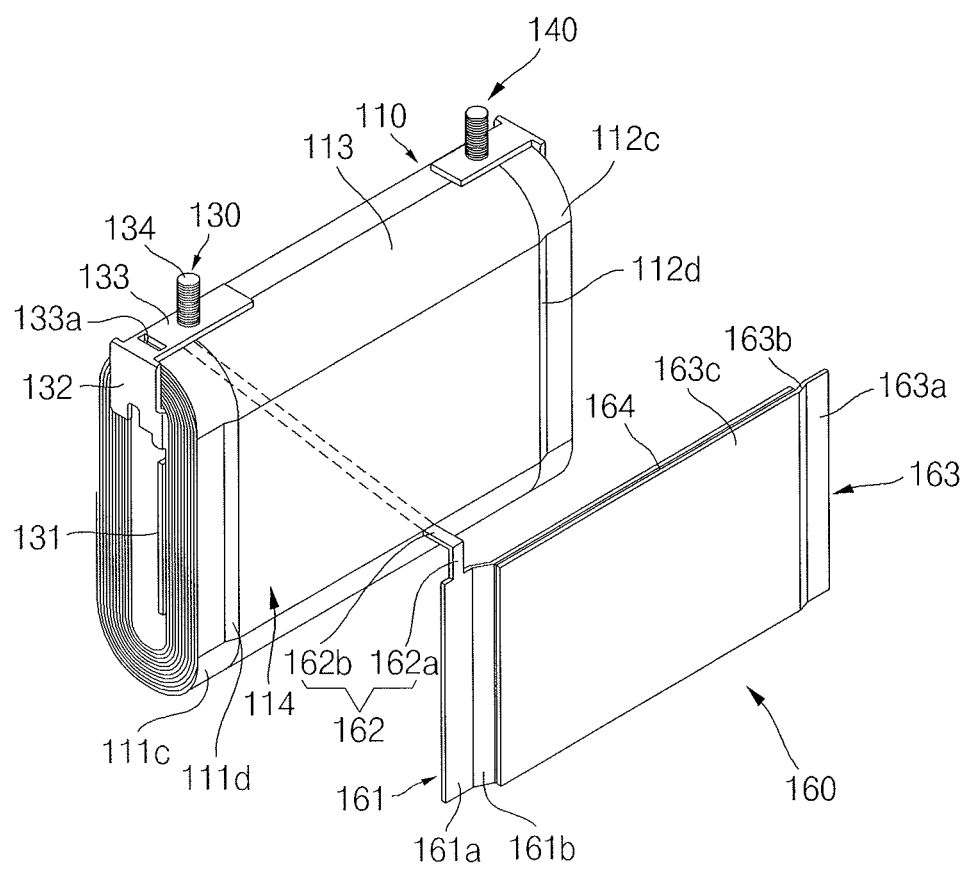
FIGS. 3A and 3B illustrate perspective views showing relationships between an electrode assembly, current collectors, terminals, and a short circuit inducing member of secondary batteries according to exemplary embodiments.
Figure 3B:
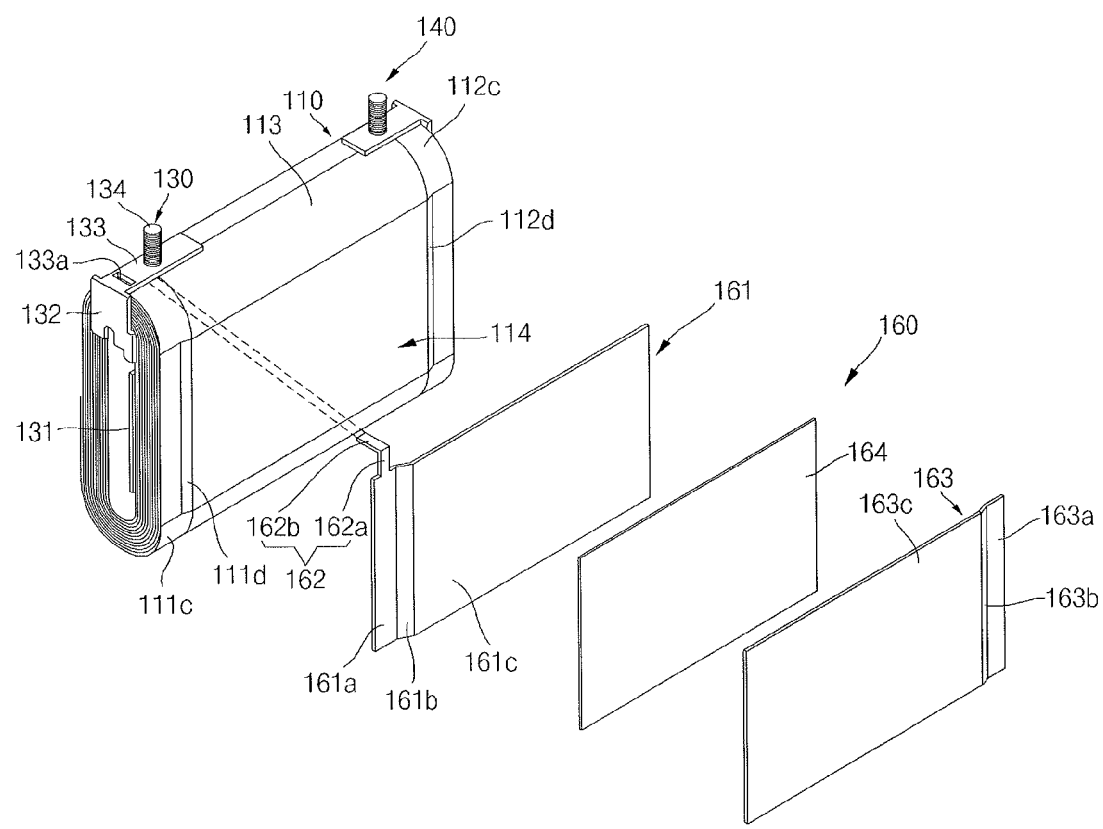

FIGS. 3A and 3B illustrate perspective views showing relationships between an electrode assembly, current collectors, terminals, and a short circuit inducing member of secondary batteries according to exemplary embodiments.

As shown in FIGS. 3A and 3B, the short circuit inducing member 160 may include a first short circuit inducing member 161 electrically connected to the second region 132 or the third region 133 of the first terminal/current collector member 130 through the fuse part 162, a second short circuit inducing member 163 electrically connected to the second non-coating region 112c of the second electrode plate 112, and an insulating plate 165 disposed between the first short circuit inducing member 161 and the second short circuit inducing member 163.

Here, the first short circuit inducing member 161 may be directly connected to the third region 133 of the first terminal/current collector member 130 through the fuse part 162. In an exemplary embodiment, the fuse part 162 may be welded to the third region 133 of the first terminal/current collector member 130. In addition, the first short circuit inducing member 161 may be electrically connected to the first non-coating region 111c of the first electrode plate 111.

The first short circuit inducing member 161 may include a planar first region (or an adhesion section) 161a welded to the first non-coating region 111c, a second region (or a bent section) 161b extending and bent from the first region 161a, and a planar third region 161c extending from the second region 161b and covering a front wide side surface 114 of the electrode assembly 110. A horizontal width of the planar first region 161a and the bent second region 161b may be substantially equal to a horizontal width of the first non-coating region 111c. An area, e.g., a horizontal width and height, of the planar third region 161c may be substantially equal to an area of the front wide side surface 114 of the electrode assembly 110. Further, while the illustrated embodiment shows that the first short circuit inducing member 161 includes the first region 161a, the second region 161b, and the third region 161c, which are bent with respect to each other, embodiments are not limited thereto. For example, the first short circuit inducing member 161 may be simply shaped of a planar plate. That is to say, the embodiments do not limit the shape of the first short circuit inducing member 161.

As described above, the planar first region 161a may be closely adhered, e.g., welded, to the first non-coating region 111c to then be electrically connected to the first non-coating region 111c. The bent second region 161b may connect the first region 161a and the third region 161c and may be bent at a predetermined angle with respect to both the first region 161a and the third region 161c. The first region 161a may be closely adhered to the first non-coating region 111c by the second region 161b, and the third region 161c may be closely adhered to the front wide side surface 114 of the electrode assembly 110. For example, in order to improve welding efficiency, the first non-coating region 111c may be closely adhered to and compressed with the first region 131 of the first terminal/current collector member 130. Accordingly, a bent section 111d, e.g., a step difference, may be formed in the first non-coating region 111c and the second region 161b may be closely adhered to the bent section 111d.

As described above, the planar first region 161a may be closely adhered to the first non-coating region 111c and the planar third region 161c may be closely adhered to the front wide side surface 114 of the electrode assembly 110. In practice, the third region 161c may be first closely adhered to the separator 113.

The first short circuit inducing member 161 may be formed of, e.g., at least one of aluminum, an aluminum alloy, copper, and a copper alloy. However, embodiments are not limited thereto. According to an exemplary embodiment, if the first non-coating region 111c is formed of aluminum, the first short circuit inducing member 161 may also be formed of aluminum. Empirically, the first short circuit inducing member 161 may have a thickness of within a range of approximately 50 to 400 nm. Without intending to be bound by this theory, in the above-stated numerical range, when an electrical short circuit occurs due to, e.g., penetration, a temperature rise of the secondary battery may be reduced.

The fuse part 162 may be electrically connected to the first short circuit inducing member 161 and the first terminal/current collector member 130. The fuse part 162 may include a first region 162a upwardly extending a predetermined length from the first short circuit inducing member 161. The first region 162a may extend to an uppermost surface of the electrode assembly 110. The fuse part 162 may include a second region 162b bent from the first region 162a. The second region 162b may extend horizontally above the electrode assembly 110 and may be adhered, e.g., welded, to the second region 132 or the third region 133 of the first terminal/current collector member 130.

When excessive short-circuit current flows, the fuse part 162 should be melted and cut off. An area or width of the fuse part 162 should be smaller than an area or width of the first short circuit inducing member 161, e.g., the width may be measured in a direction parallel to the wide side surfaces 121a and 121b. The fuse part 162 should be welded closer to the fourth region 134 than the fuse part 133a, which may be formed in the second region 132 or the third region 133 of the first terminal/current collector member 130. This is for the purpose of changing a short circuit current path in various manners by allowing the fuse part 162 of the first short circuit inducing member 161 to operate earlier than the fuse part 133a of the first terminal/current collector member 130. In addition, in order to allow the fuse part 162 to operate earlier than the fuse part 133a, a resistance value of the fuse part 162 may be made to be higher than that of the fuse part 133a. For example, a sectional area of the fuse part 162 may be made to be smaller than that of the fuse part 133a. Here, the term "sectional area" is used to mean an area through which the current flows out.

The operation of the fuse and a change in the short-circuit current will be below described again. Since the fuse part 162 is formed such that it extends from the first short circuit inducing member 161, it may be made of the same material as the first short circuit inducing member 161. For example, the fuse part 162 and the planar first region 161a may be formed as a single continuous piece.

The second short circuit inducing member 163 includes a planar first region (or an adhesion section) 163a welded to the second non-coating region 112c, a second region (or a bent section) 163b extending and bent from the first region 163a, and a planar third region 163c extending from the second region 163b and closely adhered to a wide side surface 121a of the case 120. A horizontal width of the planar first region 163a and the bent second region 163b may be substantially equal to a horizontal width of the second non-coating region 112c. An area of the planar third region 163c may be substantially equal to an area of the front wide side surface 114 of the electrode assembly 110. The first region 163a may be directly welded to the second non-coating region 112c to then be electrically connected to the second non-coating region 112c. The second region 163b may connect the first region 163a and the third region 163c and may be bent at a predetermined angle with respect to the first region 163a and the third region 163c. Further, while the illustrated embodiment shows that the second short circuit inducing member 163 includes the first region 163a, the second region 163b and the third region 163c, which are bent with respect to each other, embodiments are not limited thereto. For example, the second short circuit inducing member 163 may be simply shaped of a planar plate. That is to say, embodiments do not limit the shape of the second short circuit inducing member 163.

The first region 163a may be closely adhered to the second non-coating region 112c by the second region 163b. The third region 163c may be closely adhered to the wide side surface 121a of the case 120, e.g., through the insulating plate 165. To improve welding efficiency, the second non-coating region 112c may be closely adhered to and compressed with the first region 141. Accordingly, a bent section 112d may be formed in the second non-coating region 112c, and the second region 163b may be closely adhered to the bent section 112d.

As described above, the first region 163a may be closely adhered to the second non-coating region 112c, and the third region 163c may be closely adhered to the wide side surface 121a of the case 120. The second short circuit inducing member 163 may be formed of, e.g., at least one of copper, a copper alloy, aluminum, and an aluminum alloy. However, embodiments are not limited thereto. According to an exemplary embodiment, if the second non-coating region 112c is formed of copper, the second short circuit inducing member 163 may be formed of copper. Empirically, the second short circuit inducing member 163 may have a thickness within a range of approximately 50 to 400 μm. Without intending to be bound by this theory, in the above-stated numeral range, when an electrical short circuit occurs due to penetration, a temperature rise of the secondary battery may be reduced.

The insulating plate 164 may be disposed between the first short circuit inducing member 161 and the second short circuit inducing member 163. The insulating plate 164 may allow the first short circuit inducing member 161 and the second short circuit inducing member 163 to be electrically insulated from each other until the short circuit inducing member 160 starts operating, e.g., in the case of nail penetration. According to an exemplary embodiment, the insulating plate 164 may be made of substantially the same material as the separator. That is to say, the insulating plate 164 may be made of at least one of polyethylene (PE) and polypropylene (PP). However, embodiments are not limited thereto.

Figure 4A:
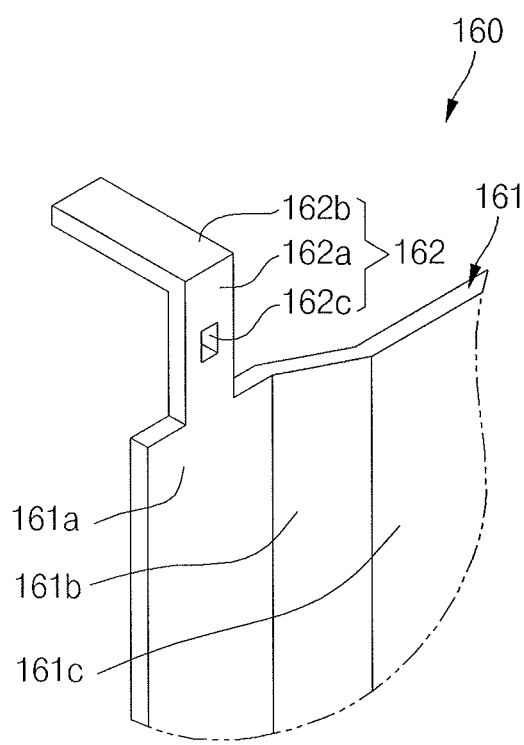
FIGS. 4A and 4B illustrate partially enlarged perspective views of exemplary embodiments of fuses of the short circuit inducing members.
Figure 4B:
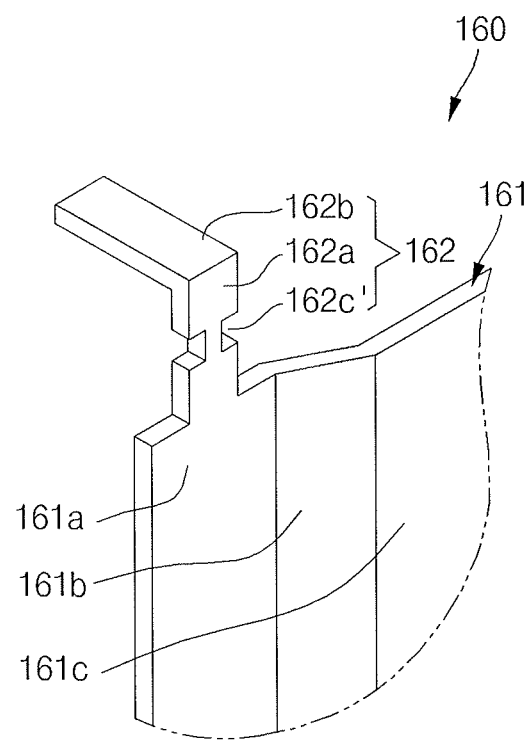

FIGS. 4A and 4B illustrate partially enlarged perspective views of alternative examples of fuses of the short circuit inducing member.

The fuse part 162 may be electrically connected, e.g., by being directly adhered to, the first terminal/current collector member 130 and the first short circuit inducing member 161. The fuse part 162 may include first region 162a and the second region 162c. One of the first region 162a and the second region 162c may include a hole 162b or a cut-out groove 162b' formed therein. An operating time of the fuse part 162 may be accurately adjusted by the size of the hole 162b or the cut-out groove 162b'. For example, the sectional area and resistance value of the fuse part 162 may be adjusted by adjusting the size of the hole 162b or the cut-out groove 162b'.

FIGS. 5A to 5D illustrate schematic diagrams of the operation of the secondary battery according to exemplary embodiments.

Figure 5A:
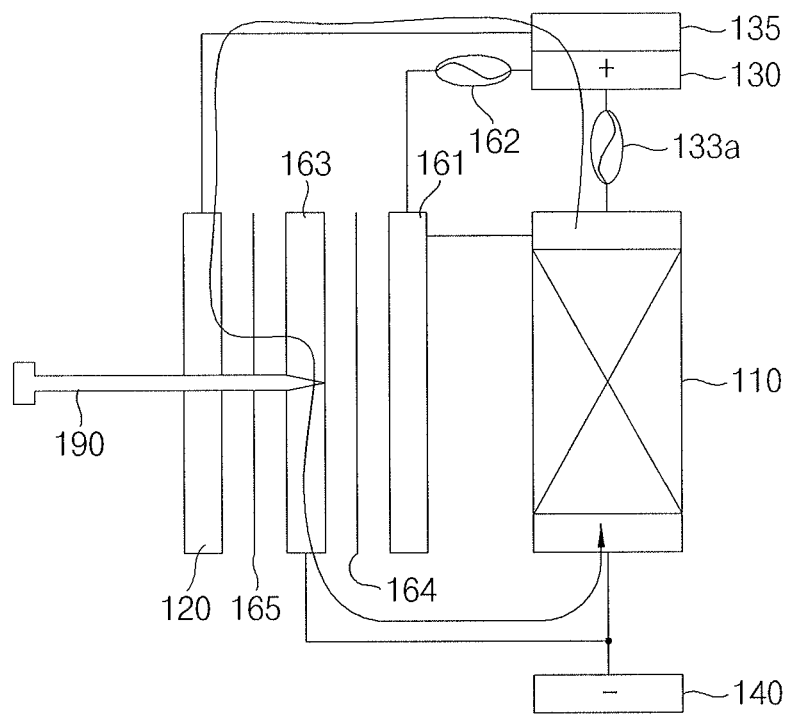
FIGS. 5A, 5B, 5C, and 5D illustrate schematic diagrams of the operation of the secondary battery according to exemplary embodiments.

Referring to FIG. 5A, when a nail 190 penetrates through the case 120 from the outside of the secondary battery 100 and penetrates through the second short circuit inducing member 163, short-circuit current may flow through a first path. The first path may be composed of the electrode assembly 110, the fuse part 133a of the first terminal/current collector member 130, the first fixing member (e.g., a high resistance member) 135, the case 120, the nail 190 and the second short circuit inducing member 163. Here, since the first fixing member 135 has higher resistance than the case 120 and the cap plate 150, the fuse part 133a provided in the first terminal/current collector member 130 is not melted and cut off but only the energy of the electrode assembly 110. For example, due to a high resistance member, the fuse part 133a of the first terminal/current collector member 130 may not be easily broken, while the energy of the electrode assembly 110 is consumed. If such a state is continued for a predetermined time or longer, the fuse part 133a provided in the first terminal 160 will be melted and cut off.

Figure 5B:
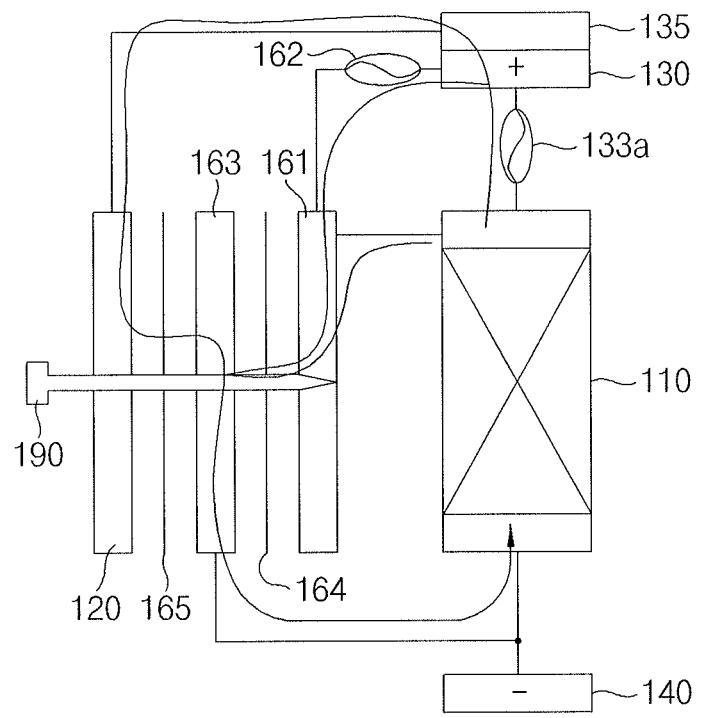
Figure 5C:
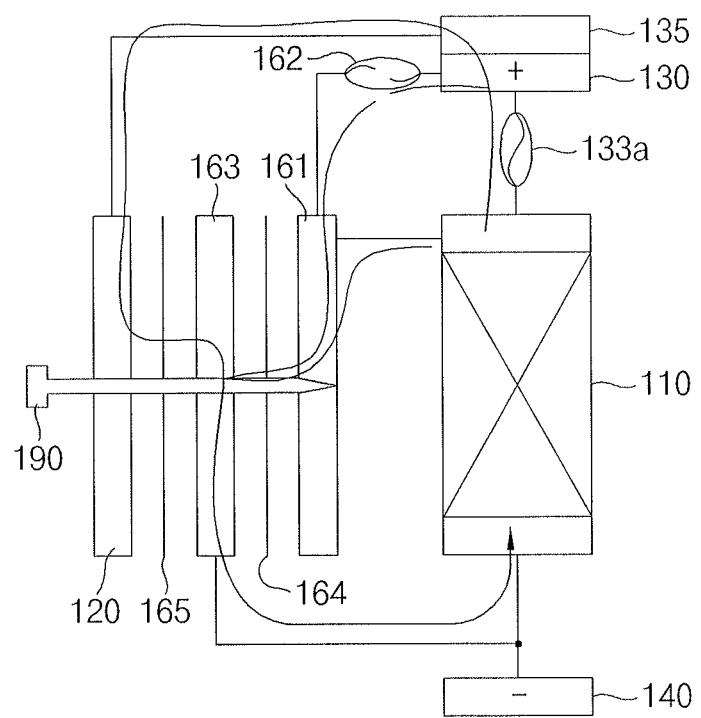

Referring to FIGS. 5B and 5C, when the nail 190 penetrates through the case 120, short-circuit current may flow through the first path and a second path composed of the electrode assembly 110, the fuse part 133a of the first terminal/current collector member 130, the fuse part 162 of the first short circuit member 161, the nail 190, and the second short circuit inducing member 163. That is to say, the short-circuit current has two paths. Here, since the electrical resistance of the fuse part 162 of the first short circuit inducing member 161 is greater than that of the fuse part 133a of the first terminal/current collector member 130, the fuse part 162 of the first short circuit inducing member 161 may be melted and cut off. For example, since electrical resistance of the fuse part 162 of the first short circuit inducing member 161 is greater than that of the fuse part 133a of the first terminal/current collector member 130, the fuse 162 of the first short circuit inducing member 161 may be first melted and cut off. Further, while the above-stated procedure is carried out, the energy of the electrode assembly may be continuously consumed.

Figure 5D:
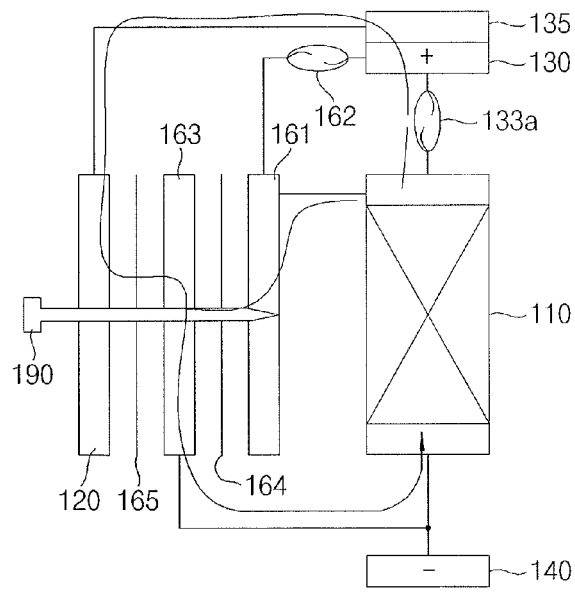

Referring to FIG. 5D, if the fuse part 162 of the first short circuit inducing member 161 is cut off, the current may flow through only the first path. Although the high resistance member, i.e., the first fixing member 135, is provided in the first path, the current may continuously flow along the first path for a predetermined time or longer, and the fuse part 133a of the first terminal/current collector member 130 may be melted and cut off. While the above-stated procedure is carried out, the energy of the electrode assembly 110 may be continuously consumed. Therefore, in the secondary battery according to exemplary embodiment, the short circuit path may be changed in various manners during nail penetration and a plurality of fuses, e.g., of fuse parts 133a and 162, may melt and cut off, so that the energy of the electrode assembly is dispersed and consumed. Accordingly, the temperature of the secondary battery may not rise excessively and a fire does not occur to the secondary battery.

Further, as described above, like the second short circuit inducing member 163, when the first short circuit inducing member 161 is electrically connected to the electrode assembly 110, short-circuit current may flow through a third path composed of the electrode assembly 110, the first short circuit inducing member 161, the nail 190, and the second short circuit inducing member 163. While the above-stated procedure is carried out, the energy of the electrode assembly may be completely consumed.

As described above, during nail penetration of the secondary battery 100 according to an exemplary embodiment, a short circuit current path may be changed in various manners, and a plurality of fuse in the fuse parts 162 and 133a may be melted and cut off, so that the energy of the electrode assembly 110 may be dispersed and consumed. Accordingly, the possibility of an excessive temperature rise and a fire from occurring to the secondary battery 100 may be reduced and/or prevented.

Figure 6A:
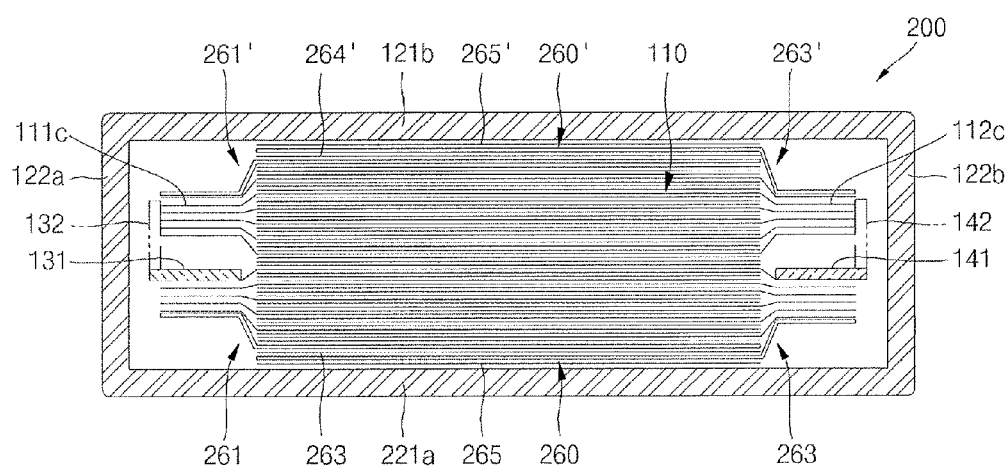
FIG. 6A illustrates a horizontal cross-sectional view of a secondary battery according to an exemplary embodiment.
Figure 6B:
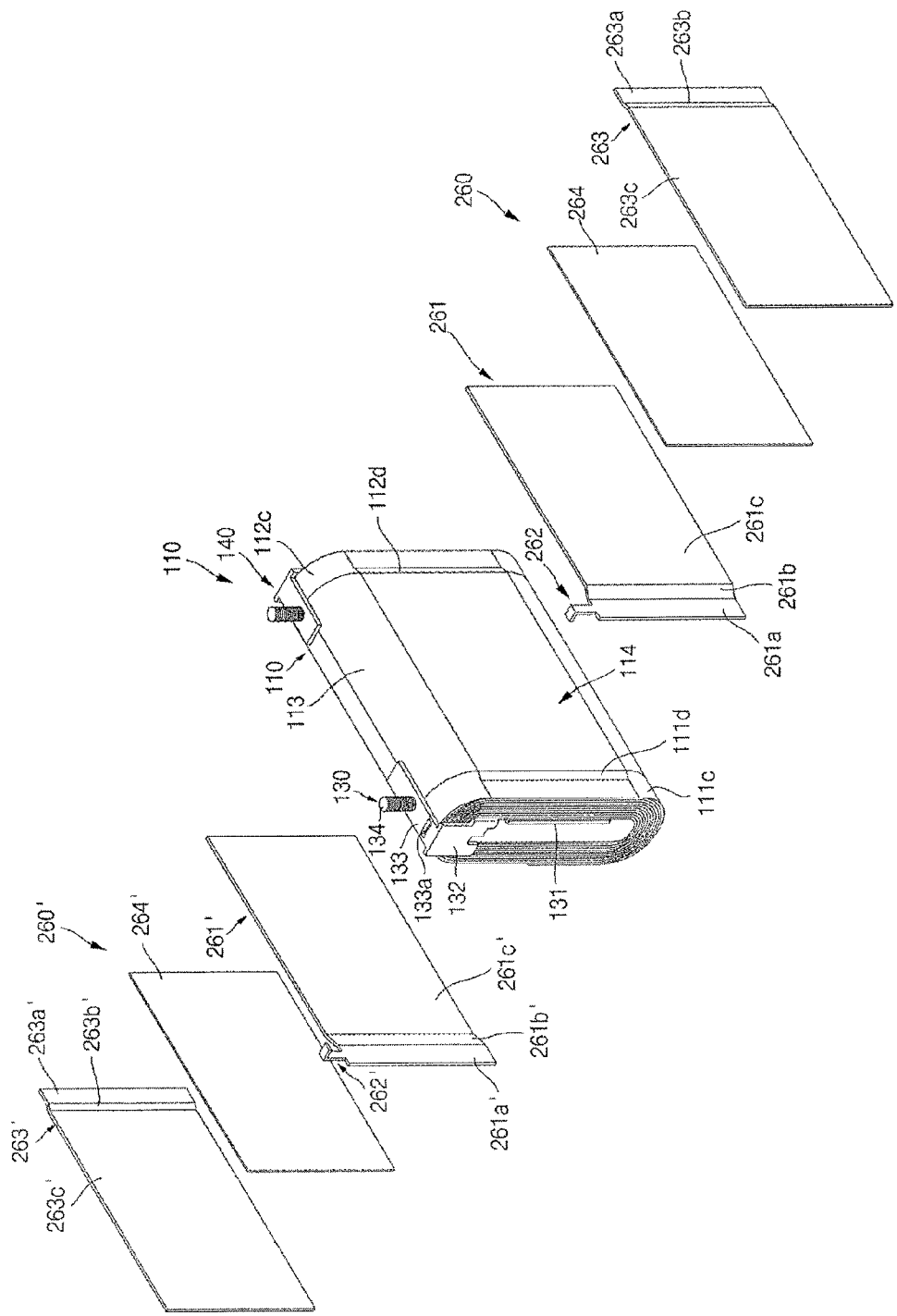
FIG. 6B illustrates a perspective view showing a relationship between an electrode assembly, current collecting members, terminals, and short circuit inducing members of the secondary battery according to an exemplary embodiment.

FIG. 6A illustrates a horizontal cross-sectional view of a secondary battery 200 according to an exemplary embodiment. FIG. 6B illustrates a perspective view showing relationships between an electrode assembly, current collecting members, terminals, and short circuit inducing members of the secondary battery 200 according to an exemplary embodiment. Elements in the secondary battery 200 may be similar to elements in the secondary battery 100 as such repeated descriptions of similar elements are omitted herein.

As shown in FIGS. 6A and 6B, the secondary battery 200 may include two short circuit inducing members 260 and 260'. That is to say, the short circuit inducing member 260 may be positioned on a front wide side surface 114 of the electrode assembly 110, and the other short circuit inducing member 260' may be positioned on an undefined opposing rear wide side surface of the electrode assembly 110. The short circuit inducing members 260 and 260' may include first short circuit inducing members 261 and 261' having fuses 262 and 262', second short circuit inducing members 262 and 262', and insulating plates 264 and 264', respectively.

The first short circuit inducing members 261 and 261' may be electrically connected to the first terminal/current collector member 130 through the fuses 262 and 262'. The respective fuses 262 and 262' may be welded to the first terminal/current collector member 130. The first short circuit inducing members 261 and 261' may be electrically connected to the first non-coating region 111c. The second short circuit inducing members 263 and 263' may be electrically connected to the second non-coating region 112c.

Here, since the configurations and functions of the fuses 262 and 262' are substantially the same as those described above, and repeated explanations will be omitted. While the illustrated embodiment shows that the short circuit inducing members 261 and 261' are respectively composed of planar first regions 261 and 261', bent second regions 261b and 261b', and planar third regions 261c and 261c', and further that the short circuit inducing members 262 and 262' are respectively composed of planar first regions 263 and 263', bent second regions 263b and 263b' and planar third regions 263c and 263c', the short circuit inducing members 261 and 261' and 262 and 262' may be simply shaped of substantially planar plates. That is to say, embodiments are not limited to the shapes of the first short circuit inducing members 260 and 260' illustrated in FIGS. 6A and 6B.

As described above, in the secondary battery 200 according to an exemplary embodiment, since the short circuit inducing members 260 and 260' are positioned between the electrode assembly 110 and the front wide side surface 121a of the case 120 and between the electrode assembly 110 and the rear wide side surface 121b of the case 120 case 120, the penetration safety of the secondary battery 200 can be further improved. In an exemplary embodiment, even if a nail penetrates from not only the front side of the secondary battery 200 but also the rear side of the secondary battery 200, the same effects of penetration characteristics can be demonstrated.

In addition, since the short circuit inducing members 260 and 260' are positioned in front and rear sides of the electrode assembly 110, respectively, swelling of the secondary battery 200 can be further effectively suppressed.

Figure 7A:
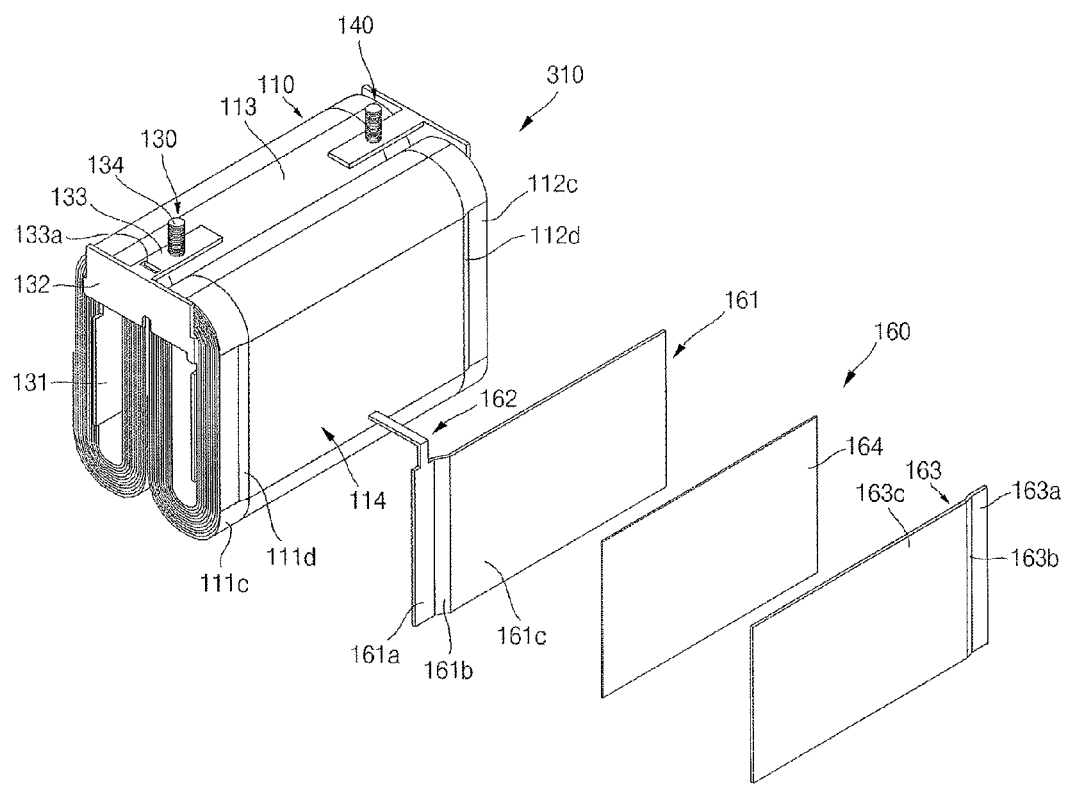
FIGS. 7A and 7B illustrate perspective views showing relationships between electrode assemblies, current collecting members, terminals, and short circuit inducing members of secondary batteries according to exemplary embodiments.
Figure 7B:
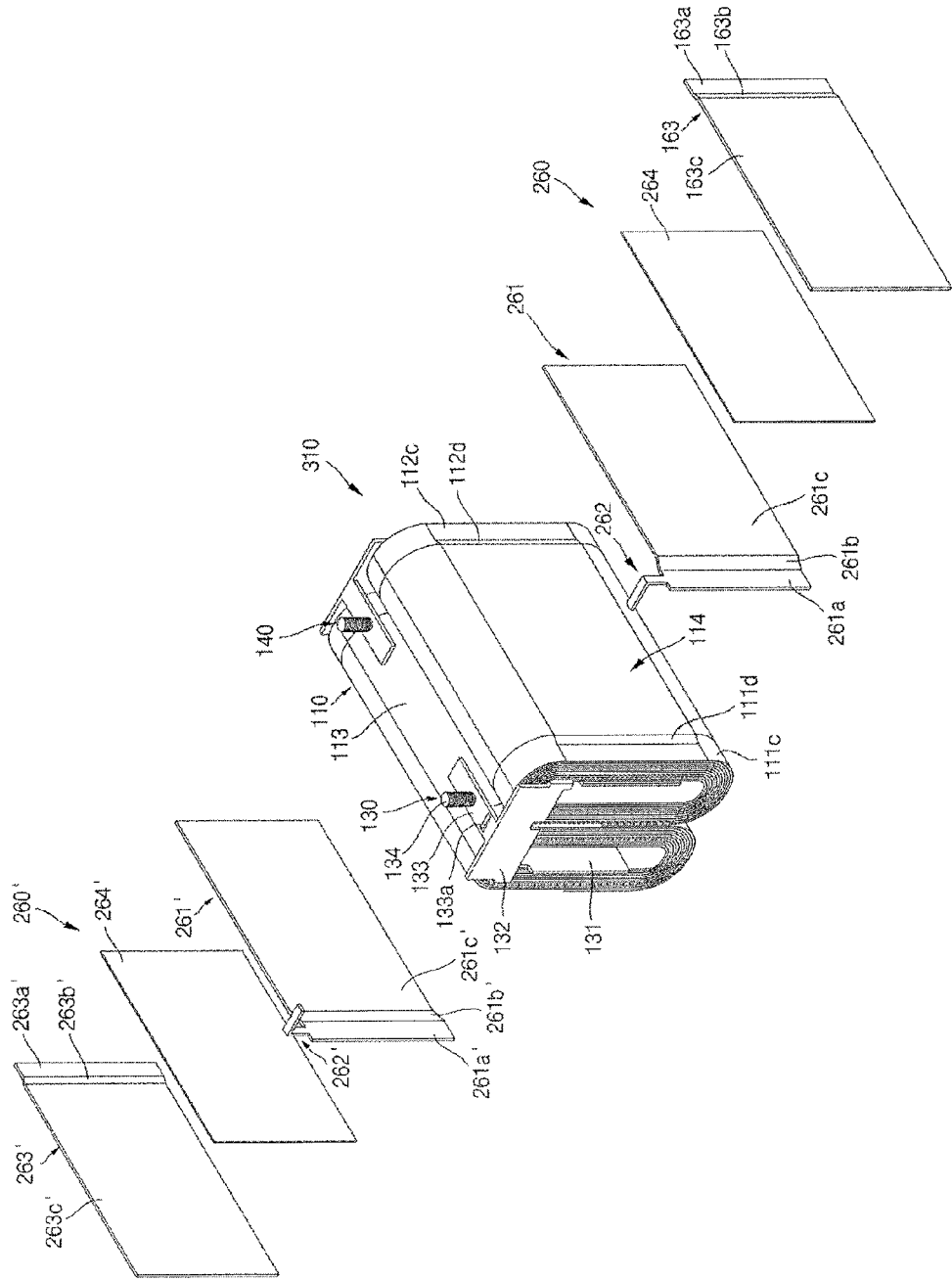

FIGS. 7A and 7B illustrate perspective views showing relationships between electrode assemblies, current collecting members, terminals, and short circuit inducing members of secondary batteries according to exemplary embodiments.

As shown in FIG. 7A, the secondary battery according to another exemplary embodiment includes at least two electrode assemblies 310. The first terminal/current collector member 130 and the second terminal/current collector member 140 may be electrically connected to the at least two electrode assemblies 310. For example, the first terminal/current collector member 130 may have the first region 131, the second region 132, the third region 133, and the fourth region 134. The first terminal/current collector member 130 may be electrically connected to the first non-coating region 111c formed in each of the at least two electrode assemblies 310. The second terminal/current collector member 140 may have the same configuration as the first terminal/current collector member 130. The second terminal/current collector member 140 may be electrically connected to the second non-coating region 112c formed in each of the at least two electrode assemblies 310.

The short circuit inducing member 160 may be positioned on a front wide side surface 114 of one of the at least two electrode assemblies 310. The short circuit inducing member 160 may include the first short circuit inducing member 161 having a fuse part 162, the second short circuit inducing member 163, and the insulating plate 164. The first short circuit inducing member 161 may be electrically connected to the first terminal/current collector member 130 through the fuse part 162. For example, the fuse part 162 may be welded to the first terminal/current collector member 130. The short circuit inducing member 160 may be disposed between the front wide side surface 114 of one of the at least two electrode assemblies 310 and the case 120 (not shown).

As described above, the exemplary embodiment shown in FIG. 7A provides the secondary battery having large capacity and improved penetration safety. In addition, the exemplary embodiment shown in FIG. 7A provides the secondary battery capable of suppressing swelling.

As shown in FIG. 7B, the secondary battery according to another exemplary embodiment includes at least two electrode assemblies 310. The first terminal/current collector member 130 and the second terminal/current collector member 140 may be electrically connected to the at least two electrode assemblies 310.

In addition, the short circuit inducing member 260 may be positioned on the front wide side surface 114 of one of the at least two electrode assemblies 310, and the short circuit inducing member 260' may be positioned on the rear wide side surface of the other of the at least two electrode assemblies 310. The short circuit inducing member 260 may include the first short circuit inducing members 261 having the fuse 262, the second short circuit inducing member 263, and the insulating plate 264. The second short circuit inducing member 260' may include the first short circuit inducing members 261' having the fuse 262', the second short circuit inducing member 263', and the insulating plate 264'. The first and second short circuit inducing members 261 and 261' may be directly electrically connected to the first terminal/current collector member 130 through the fuses 262 and 262', respectively.

As described above, in the secondary battery according to another exemplary embodiment, the short circuit inducing member 260 may be positioned between the electrode assemblies 310 and the front wide side surface of the case 120 (not shown) and the short circuit inducing member 260' may be positioned between the electrode assemblies 310 and the rear wide side surface of the case 120. Therefore, the secondary battery having further improved penetration safety can be provided. The secondary battery having further effectively suppressed swelling may also be provided.

Figure 8A:
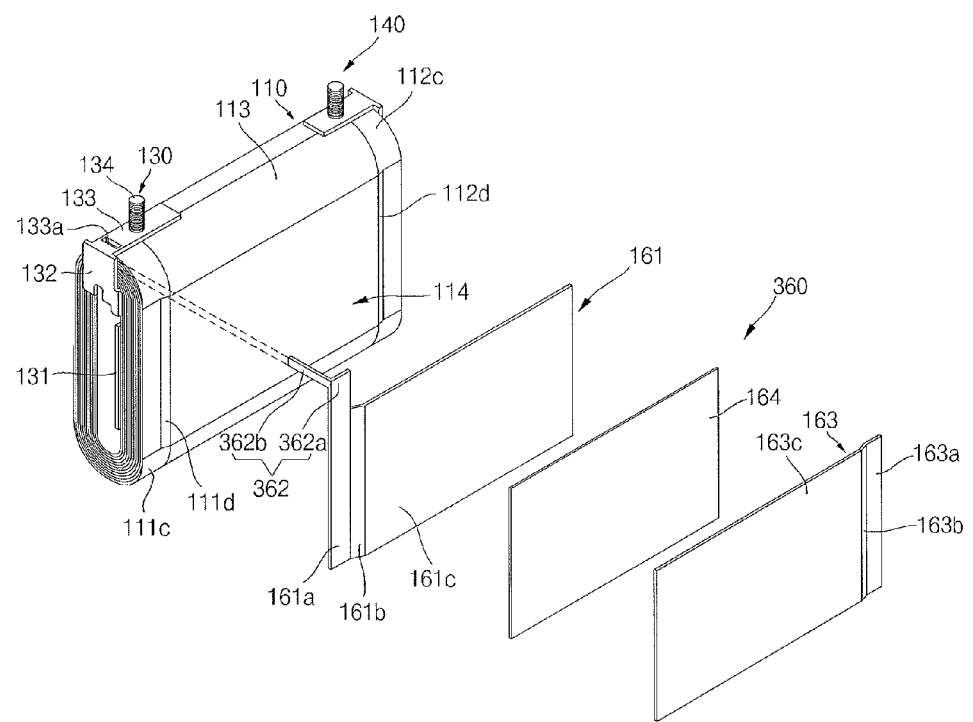
FIGS. 8A, 8B, and 8C illustrate perspective views showing relationships between an electrode assembly, current collecting members, terminals, and short circuit inducing members of secondary batteries according to exemplary embodiments.
Figure 8B:
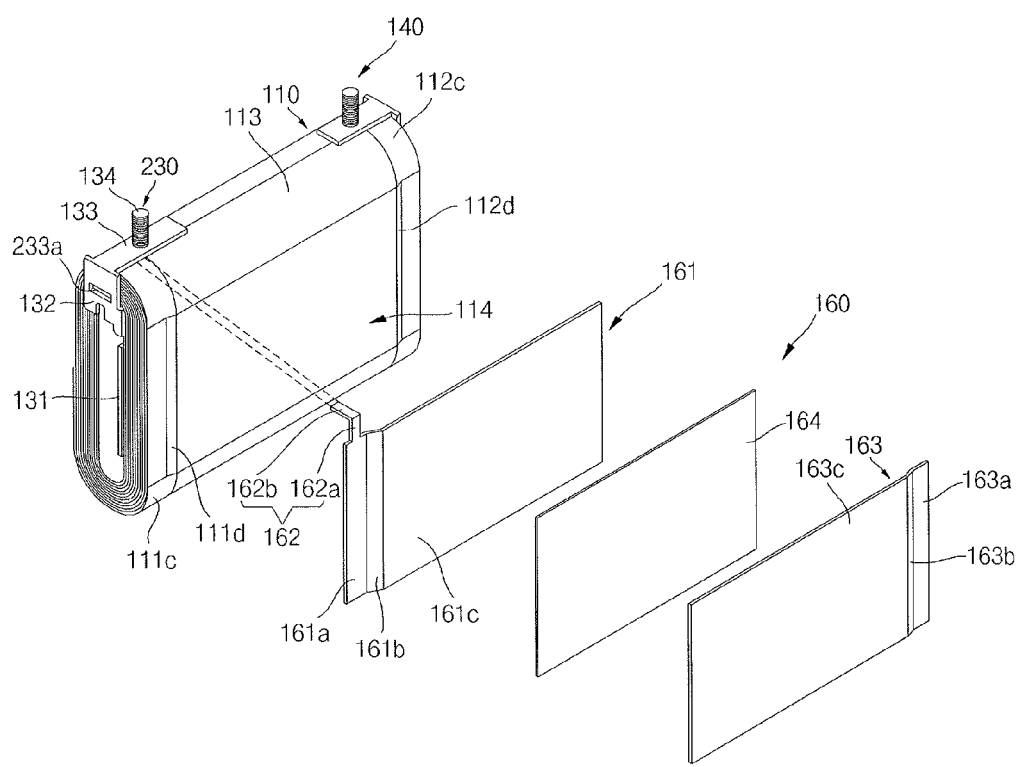
Figure 8C:
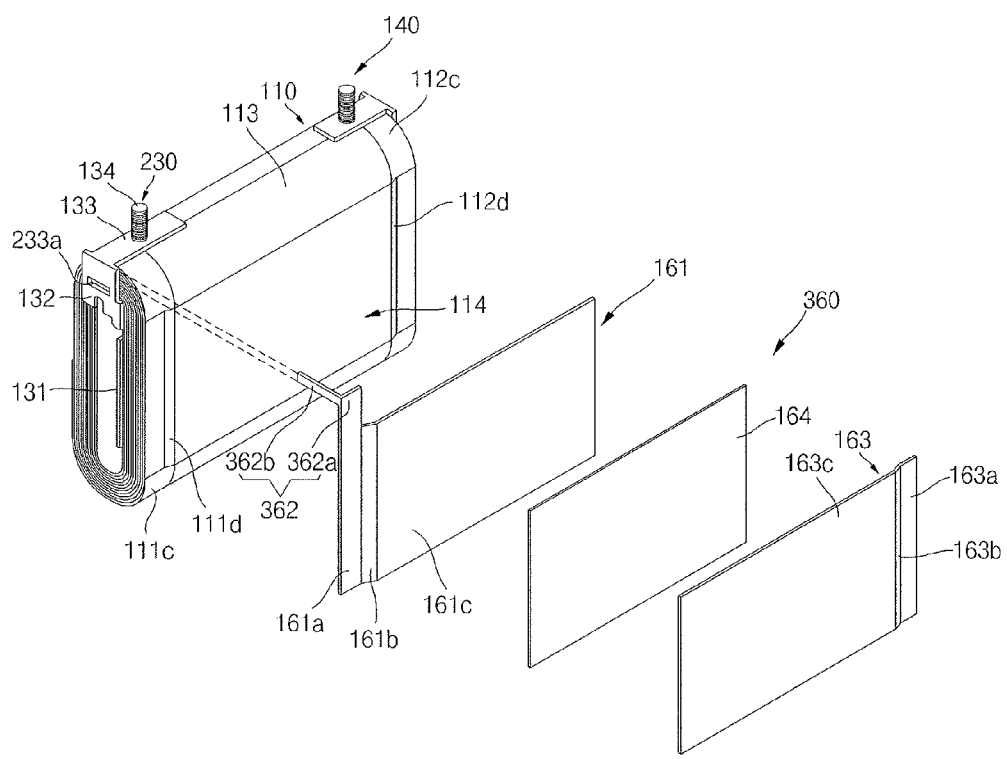

FIGS. 8A, 8B, and 8C illustrate perspective views showing relationships between an electrode assembly, current collecting members, terminals, and short circuit inducing members of secondary batteries according to exemplary embodiments Referring to FIG. 8A, the secondary battery may have a similar configuration as that discussed with reference to FIG. 3B. Therefore, a description of like elements is omitted. As illustrated in FIG. 8A, a short circuit inducing member 360 may include the first short circuit inducing member 161 having a fuse part 362. The fuse part 362 may be similar to the fuse part 162, except the fuse part 362 may include a portion adhered, e.g., welded, to the second portion 132 of the first terminal/current collector member 130. For example, the fuse part 362 may include a first region 362a that extends from the planar first region 161a of the first short circuit inducing member 161 and a second region 362b that is bent from the first region 362a. The second region 262b may contact the second portion 132 of the first terminal/current collector member 130.

Referring to FIG. 8B, the secondary battery may have a similar configuration as that discussed with reference to FIG. 3B. Therefore, a description of like elements is omitted. As illustrated in FIG. 8B, the first terminal/current collector member 130 may include a fuse part 233a that is similar to the fuse part 133a, except the fuse part 233a is formed in the second portion 132 of the first terminal/current collector member 130.

Referring to FIG. 8C, the secondary battery may include the fuse part 362 that includes first region 362a extending from the planar first region 161a of the first short circuit inducing member 161 and the second region 362b that is bent from the first region 362a. The second region 262b may contact the second portion 132 of the first terminal/current collector member 130. The secondary battery 100 may further include the first terminal/current collector member 130 having the fuse part 233a that is formed in the second portion 132 of the first terminal/current collector 161.

By way of summation and review, there are various safety tests that may be performed on secondary batteries. For example, tests include a penetration test, a crushing test, and an overcharge test. The penetration test is quite an important safety test carried out in anticipation of damages caused to the secondary battery in an event of an accident, e.g., a car accident. In particular, in a secondary battery test under severe conditions, such as a nail penetration, it is necessary to prevent the secondary battery from undergoing excessive temperature rise or a fire after a penetration of the secondary battery.

Embodiments, e.g., the exemplary embodiments discussed above, relate to a secondary battery that may be capable of securing safety even in an abnormal situation, e.g., when breakage is caused by force applied from an outside of the secondary battery. For example, in the event of nail penetration from the outside, embodiments relate to changing a short circuit current path multiple times. A plurality of fuses may be melted or cut off to disperse and consume energy of the electrode assembly so that the possibility of an excessive temperature rise and/or a fire may be reduced and/or prevented. That is to say, Joule's heat of the electrode assembly is dispersed and consumed, thereby preventing the secondary battery from undergoing an excessive temperature rise and a fire. Therefore, the safety and reliability of the secondary battery may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery, comprising:
   a case;
   an electrode assembly in the case;
   a current collector electrically connected with the electrode assembly;
   a terminal coupled to the current collector; and
   a first short circuit inducing member electrically coupled to the electrode assembly and to the current collector, the first short circuit inducing member being arranged between the electrode assembly and the case, and the first short circuit inducing member including a first fuse part;
   wherein the current collector includes a second fuse part having a different electrical resistance from that of the first fuse part.

2. The battery as claimed in claim 1, wherein the first short circuit inducing member is coupled to the current collector through the first fuse part.

3. The battery as claimed in claim 1, wherein the first short circuit inducing member includes:
   a first planar region that overlaps a non-coating region of the electrode assembly, the first fuse part extending from the first planar region to the current collector,
   a second planar region that overlaps a region of the electrode assembly that excludes the non-coating region, and
   a bent region that is bent from the first planar region and the second planar region.

4. The battery as claimed in claim 3, wherein the first planar region is adhered to the non-coating region and the second planar region is adhered to the region of the electrode assembly that excludes the non-coating region.

5. The battery as claimed in claim 3, wherein a width of the first fuse part is smaller than a width of the first planar region.

6. The battery as claimed in claim 1, further comprising a second short circuit inducing member and an insulating plate, the second short circuit inducing member overlapping the first short circuit inducing member and the insulating plate being arranged between the first and second short circuit inducing members.

7. The battery as claimed in claim 6, wherein the first short circuit inducing member is arranged between the insulating plate and the electrode assembly.

8. The battery as claimed in claim 1, further comprising a second short circuit inducing member, the second short circuit inducing member including a first planar region adhered to a second non-coating region of the electrode assembly, a third planar region adhered to a region of the electrode assembly that excludes the second non-coating region, and a second planar region extending between the first and third planar regions.

9. The battery as claimed in claim 1, wherein the first short circuit inducing member is one of a plurality of first short circuit inducing members, each of the plurality of first short circuit inducing members being arranged adjacent to different sides of the electrode assembly.

10. The battery as claimed in claim 1, wherein the electrode assembly is one of a plurality of electrode assemblies and the first short circuit inducing member is one of a plurality of first short circuit inducing members.

11. The battery as claimed in claim 1, wherein:
    the current collector includes a first region, a second region, and a third region,
    the first region is coupled to a non-coated region of the electrode assembly,
    the third region is electrically connected to the terminal,
    the second region extends between the first and third regions, and
    the first fuse part is connected to the second region or to the third region.

12. The battery as claimed in claim 11, wherein the current collector includes a second fuse part, the second fuse part being in the second region or in the third region of the current collector.

13. The battery as claimed in claim 12, wherein the second fuse part is in the second region and the first fuse part is adjacent to the third region.

14. A battery, comprising:
    a case;
    an electrode assembly in the case;
    a current collector electrically connected with the electrode assembly;
    a terminal coupled to the current collector; and
    a first short circuit inducing member electrically coupled to the electrode assembly and to the current collector, the first short circuit inducing member being arranged between the electrode assembly and the case, and the first short circuit inducing member including a first fuse part;
    wherein:
    the terminal extends from an inside of the case to an outside of the case, and
    the current collector includes a second fuse part, the first fuse part being closer to the terminal than the second fuse part.

15. The battery as claimed in claim 14, wherein the first fuse part has a first resistance value and the second fuse part has a second resistance value, the first resistance value being higher than the second resistance value.

16. The battery as claimed in claim 14, wherein the first fuse part has a first sectional area and the second fuse part has a second sectional area, the first sectional area being smaller than the second sectional area.

17. A battery, comprising:
    a case;
    an electrode assembly in the case;
    a current collector electrically connected with the electrode assembly;
    a terminal coupled to the current collector; and a first short circuit inducing member electrically coupled to the electrode assembly and to the current collector, the first short circuit inducing member being arranged between the electrode assembly and the case, and the first short circuit inducing member including a first fuse part;

wherein the first short circuit inducing member includes a first planar region that overlaps a non-coating region of the electrode assembly, the first fuse part extending from the first planar region to the current collector, wherein the first fuse part includes:

a first portion that extends from the first planar region of the first short circuit inducing member, and a second portion bent from the first portion and adhered to the current collector.

18. The battery as claimed in claim 17, wherein the current collector includes a second fuse part having a different electrical resistance from that of the first fuse part.

19. The battery as claimed in claim 17, wherein the first and second portions of the first fuse part as well as the first planar region, and a second planar region that overlaps a region of the electrode assembly that excludes the non-coating regions of the first short circuit inducing member are made of a same material and are integrally formed as one continuous piece.

20. The battery as claimed in claim 17, wherein the first portion of the first fuse part includes at least one hole or cut-out groove.

* * * * *